US011797547B2

(12) United States Patent
Yao et al.

(10) Patent No.: US 11,797,547 B2
(45) Date of Patent: Oct. 24, 2023

(54) INTENTION BASED SEARCH TECHNIQUES

(71) Applicant: Citrix Systems, Inc., Fort Lauderdale, FL (US)

(72) Inventors: Shutian Yao, Nanjing (CN); Ke Xu, Nanjing (CN); Zongpeng Qiao, Nanjing (CN)

(*) Notice: Subject to any disclaimer, the term of this patent is extended or adjusted under 35 U.S.C. 154(b) by 150 days.

(21) Appl. No.: 17/380,795

(22) Filed: Jul. 20, 2021

(65) Prior Publication Data
US 2022/0382765 A1   Dec. 1, 2022

Related U.S. Application Data

(63) Continuation of application No. PCT/CN2021/096492, filed on May 27, 2021.

(30) Foreign Application Priority Data

May 27, 2021   (WO) ................ PCT/CN2021/096492

(51) Int. Cl.
*G06F 7/00* (2006.01)
*G06F 16/2457* (2019.01)
*G06F 16/248* (2019.01)
*G06F 40/289* (2020.01)

(52) U.S. Cl.
CPC ...... *G06F 16/24578* (2019.01); *G06F 16/248* (2019.01); *G06F 40/289* (2020.01)

(58) Field of Classification Search
CPC ............. G06F 16/24578; G06F 16/248; G06F 16/951; G06F 16/2425; G06F 16/9537; G06F 16/2455; G06F 16/9535; G06F 40/289; G06F 9/453
See application file for complete search history.

(56) References Cited

U.S. PATENT DOCUMENTS

| 2010/0115284 | A1* | 5/2010 | Hahn ...................... G06F 21/64 |
| | | | 713/179 |
| 2014/0101127 | A1 | 4/2014 | Simhon et al. |
| 2015/0033219 | A1 | 1/2015 | Breiner et al. |
| 2016/0085800 | A1 | 3/2016 | Pujari |
| 2016/0259859 | A1 | 9/2016 | Sathish et al. |
| 2016/0306801 | A1* | 10/2016 | Andrianakou ........ G06F 16/248 |
| 2016/0335314 | A1* | 11/2016 | Grigoreva ............. G06F 16/951 |
| 2017/0078413 | A1* | 3/2017 | Chi ........................ H04L 67/535 |
| 2018/0097905 | A1* | 4/2018 | Todasco .................. H04L 67/02 |

OTHER PUBLICATIONS

Nov. 16, 2021—(WO) ISR & WO—App. No. PCT/CN21/96492.

* cited by examiner

*Primary Examiner* — Mohammad A Sana

(57) ABSTRACT

Methods, apparatuses, and systems for intention based search techniques are described herein. An example method comprises receiving data indicative of an intent of a user to perform an action via at least one application, the data comprising a description of the action that is input via a client device application on a client device, identifying, by the computing device, the at least one application based on a comparison of the description of the action and one or more records, the one or more records being indicative of prior intents of one or more users to perform actions and indicative of at least one selection by the one or more users to perform the actions with a selected application, and providing, by the computing device, output to the client device to enable performance of the action via the at least one application.

17 Claims, 13 Drawing Sheets

INTENTION BASED SEARCH TECHNIQUES

CROSS-REFERENCE TO RELATED APPLICATIONS

This application is a bypass continuation of PCT/CN2021/096492 filed May 27, 2021, and having the same title. PCT/CN2021/096492 is hereby incorporated by reference herein in its entirety.

FIELD

Aspects described herein generally relate to computer systems, and hardware and software related thereto. More specifically, one or more aspects described herein provide intention based search techniques to identify results responsive to a query.

BACKGROUND

With the advancement of technology in general, more and more stored data is being amassed. For example, new documents, webpages, applications, and the like are made daily, if not even more frequently. In order identify particular data amongst all amassed data, search techniques are often implemented to sift through the amassed data for relevant results. Search techniques, however, often require a full or partial name of the result for which a user is searching to be within a query in order for the search techniques to provide relevant results responsive to the query.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

In many instances, people performing searches are unaware of the specificities of the item for which they are searching. This could be due to a lack of knowledge, due to a temporary lapse in recollection, or other various reasons. It is often difficult to locate something if the searcher is unable to identify that something by name. Not only does this difficulty prevent searchers from locating correct or preferred results, but this difficulty also causes searchers to locate incorrect or nonpreferred results.

As described in more detail herein, this application sets forth search methods, algorithms, systems, and techniques for locating results responsive to a query including, for example, applications, documents, web pages, files, folders, templates, records, or other data. Rather than (or in addition to) searching for such items by name, the following sets forth search techniques that utilize a description for which the user wants the item. For example, instead of (or in addition to) searching for an email client by typing "Outlook," the following techniques may enable a user to describe an action the user wants to do, such as, for example, "I want to send an email," and the search techniques may determine one or more applications capable of performing that action.

An example method may comprise receiving, by a computing device, data indicative of an intent of a user to perform an action via at least one application, the data comprising a description of the action that is input into a client device, identifying, by the computing device, the at least one application based on a comparison of the description of the action and one or more records, the one or more records being indicative of prior intents of one or more users to perform actions and indicative of at least one selection by the one or more users to perform the actions with a selected application, and providing, by the computing device, output to the client device to enable performance of the action via the at least one application.

An example apparatus may comprise one or more processors, and memory storing instructions that, when executed by the one or more processors, cause the apparatus to receive data indicative of an intent of a user to perform an action via at least one application, the data comprising a description of the action that is input into a client device, identify the at least one application based on a comparison of the description of the action and one or more records, the one or more records being indicative of prior intents of one or more users to perform actions and indicative of at least one selection by the one or more users to perform the actions with a selected application, and provide output to the client device to enable performance of the action via the at least one application.

An example system may comprise a first device comprising one or more first processors and first memory, a second device comprising one or more second processors and second memory, wherein the first memory stores first instructions that, when executed by the one or more first processors, cause the first device to receive data indicative of an intent of a user to perform an action via at least one application, the data comprising a description of the action, identify the at least one application based on a comparison of the description of the action and one or more records, the one or more records being indicative of prior intents of one or more users to perform actions and indicative of at least one selection by the one or more users to perform the actions with a selected application and provide, to the second device, output to enable performance of the action via the at least one application, and wherein the second memory stores second instructions that, when executed by the one or more second processors, cause the second device to determine, based on user input, the description of the action, send, to the first device, the description of the action, receive, from the first device, the output to enable performance of the action via the at least one application, and present the at least one application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein relate to search techniques using a user's intention to perform an action as a basis for locating applications instead of, or in addition to, an application's name. A server may analyze an indication of a user's intention to perform an action that is received from a client device and create word and sentence vectors. Based on the word and sentence vectors, the server may identify similar sentence vectors stored within a database, each which being associated with an application. The server may determine for similar applications identified, a usage percentage of the corresponding application. The server may output the identified applications and determined usages percentages to the client device. As a result, a user attempting to locate an application can find not only applications that satisfy the action that the user intended to perform, but also an indication of the amount that those applications are utilized by his or her colleagues. The techniques disclosed herein enable all users to consistently choose a same application among a number of applicable applications and enhance organizational collaboration by increasing the probability that all users will use the same applications for the same or similar actions.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
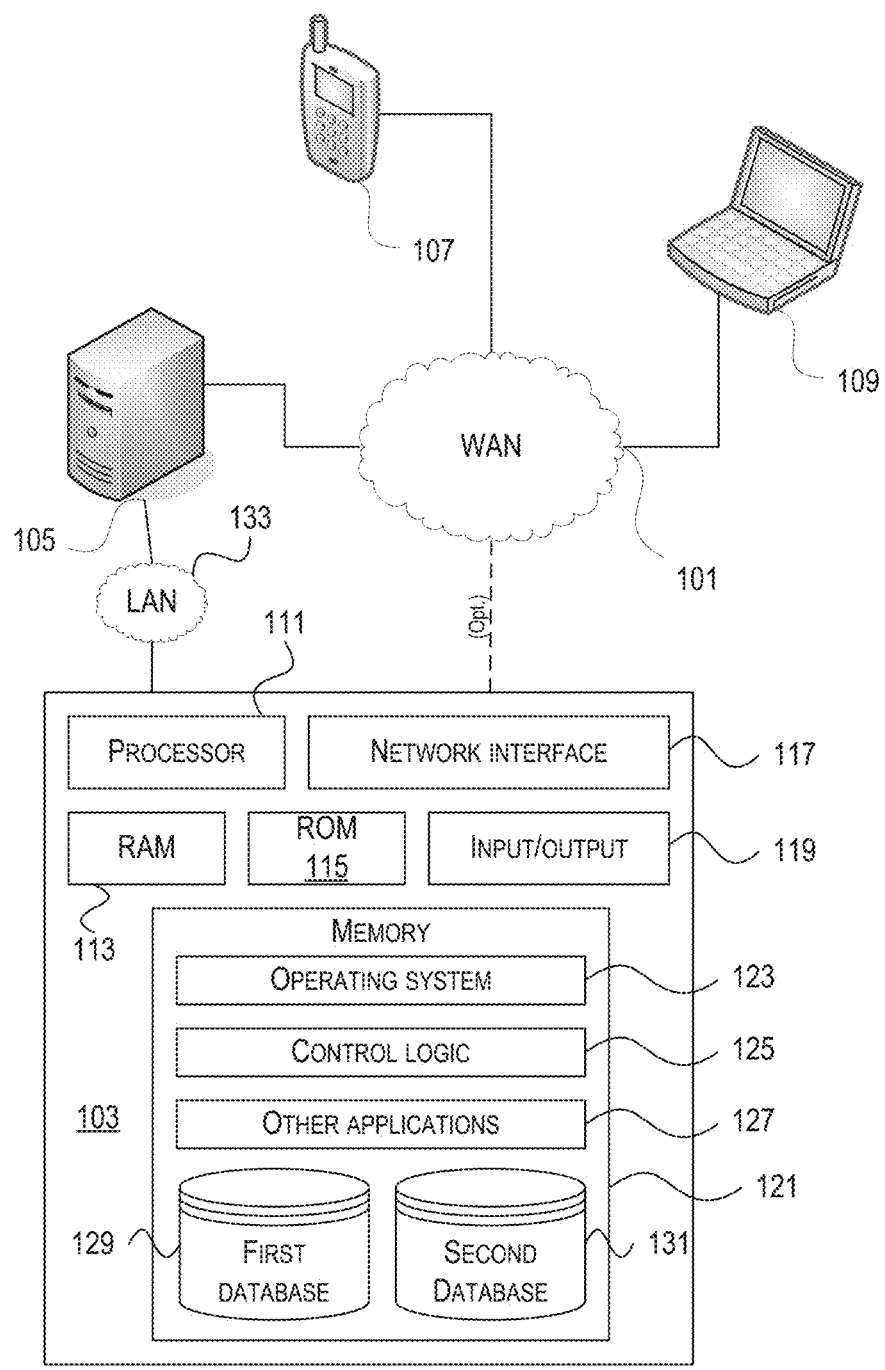
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
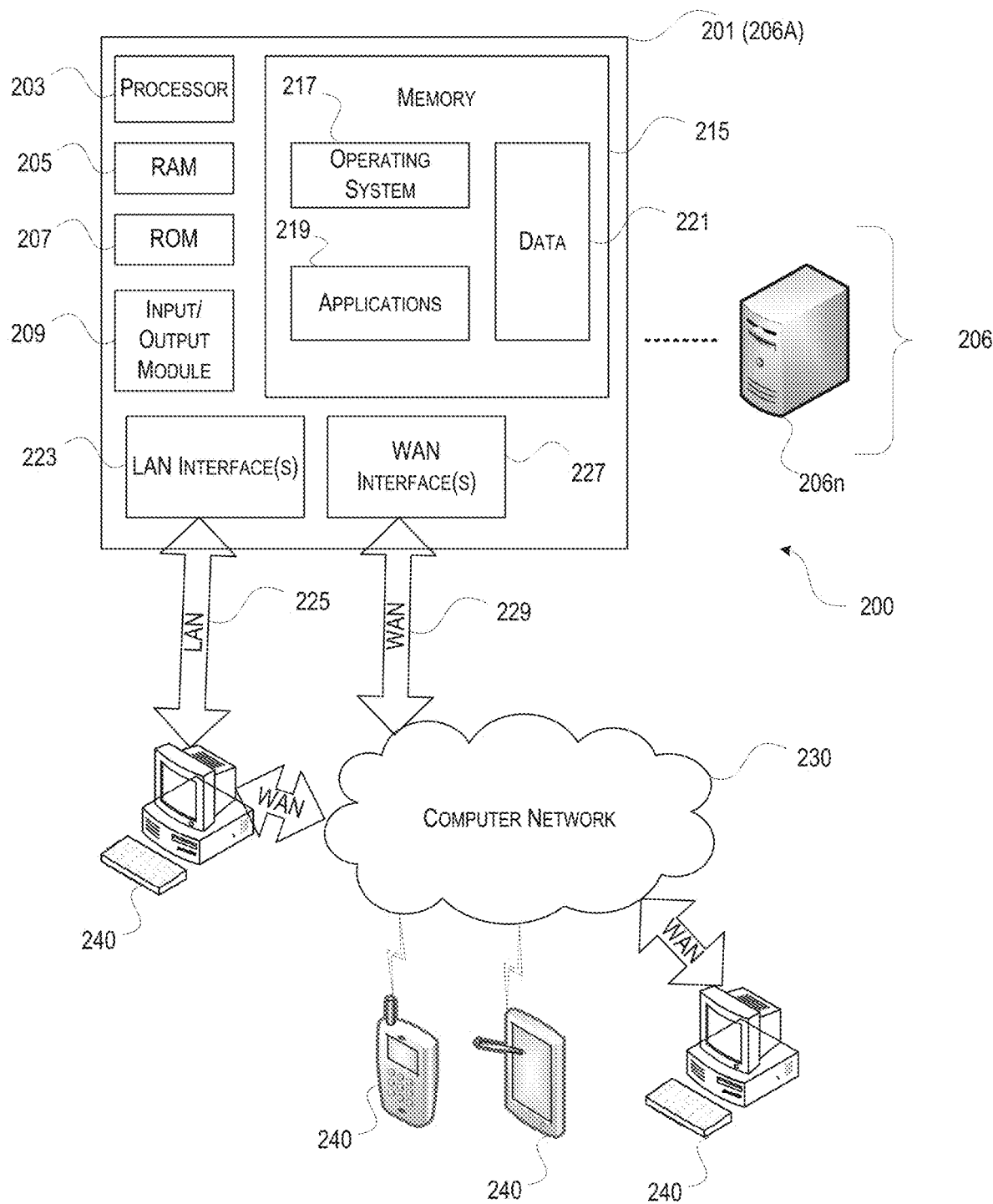
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
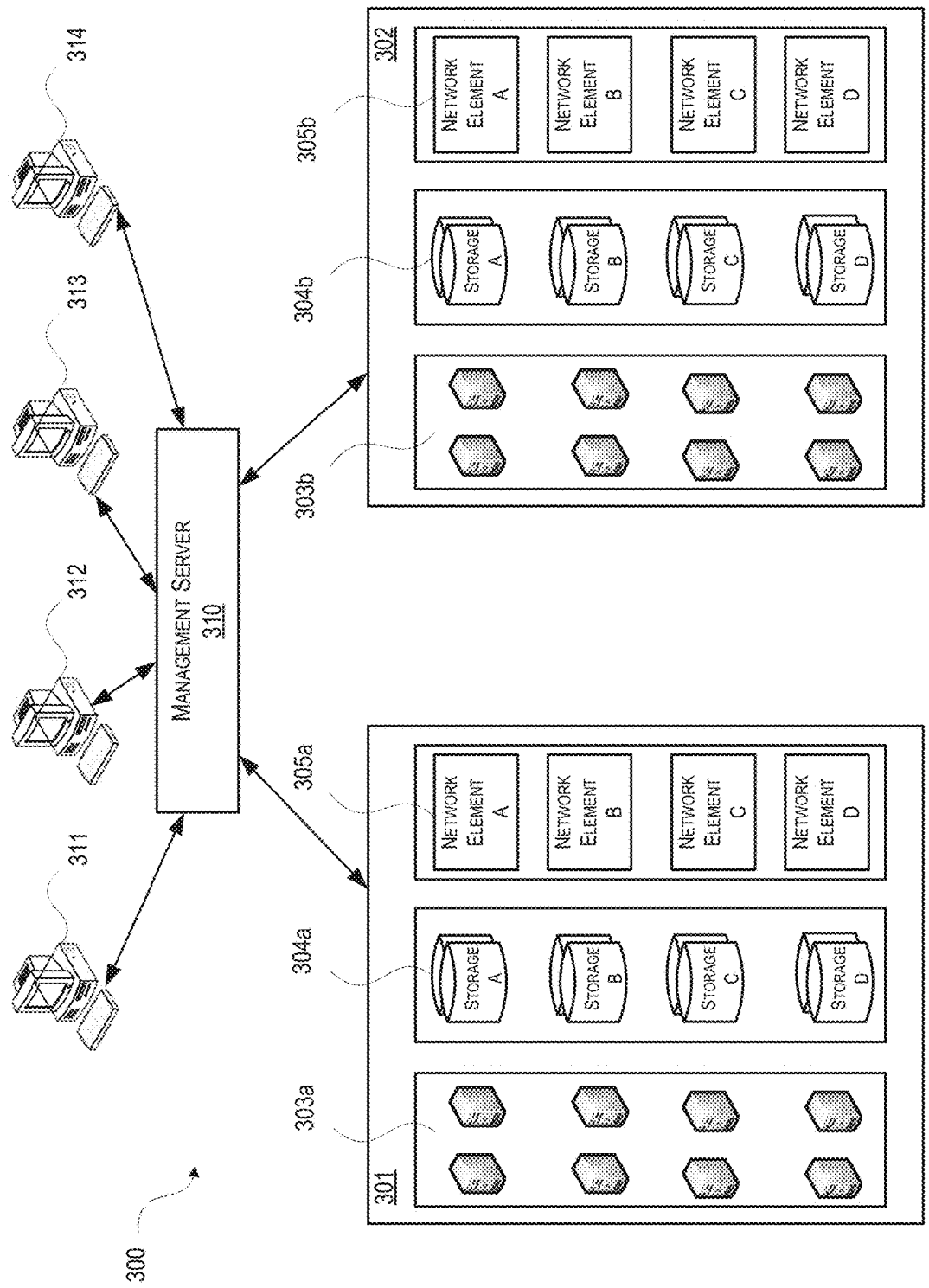
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network elements 305a-305b (generally referred herein as "network resources 305")) of the cloud system.

Management server 310 may be implemented on one or more physical servers. The management server 310 may run, for example, Citrix Cloud by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, to different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as virtualization servers, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer (e.g., as shown in FIGS. 1-2) with additional hardware and/or software resources configured to create and manage virtual machines and provide other services to customers using the physical resources in the cloud. The virtualization layer may include hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 303 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Resource Management System

Figure 4A:
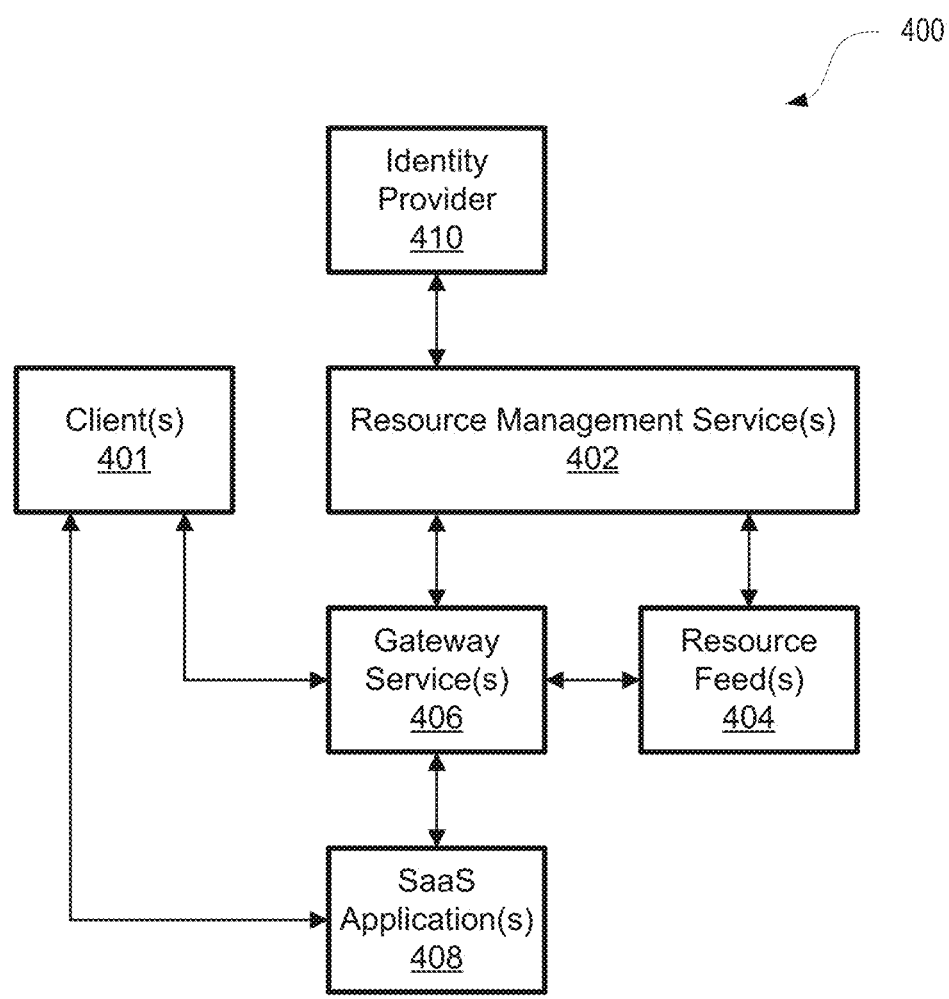
FIG. 4A depicts a block diagram of an example system in which resource management services may manage and streamline access by clients to resource feeds (via one or more gateway services) and/or software-as-a-service (SaaS) applications.

FIG. 4A is a block diagram of an example multi-resource access system 400 in which one or more resource management services 402 may manage and streamline access by one or more clients 401 to one or more resource feeds 404 (via one or more gateway services 406) and/or one or more software-as-a-service (SaaS) applications 408. In particular, the resource management service(s) 402 may employ an identity provider 410 to authenticate the identity of a user of a client 401 and, following authentication, identify one of more resources the user is authorized to access. In response to the user selecting one of the identified resources, the resource management service(s) 402 may send appropriate access credentials to the requesting client 401, and the client 401 may then use those credentials to access the selected resource. For the resource feed(s) 404, the client 401 may use the supplied credentials to access the selected resource via a gateway service 406. For the SaaS application(s) 408, the client 401 may use the credentials to access the selected application directly.

The client(s) 401 may be any type of computing devices capable of accessing the resource feed(s) 404 and/or the SaaS application(s) 408, and may, for example, include a variety of desktop or laptop computers, smartphones, tablets, etc. The resource feed(s) 404 may include any of numerous resource types and may be provided from any of numerous locations. In some embodiments, for example, the resource feed(s) 404 may include one or more systems or services for providing virtual applications and/or desktops to the client(s) 401, one or more file repositories and/or file sharing systems, one or more secure browser services, one or more access control services for the SaaS applications 408, one or more management services for local applications on the client(s) 401, one or more internet enabled devices or sensors, etc. The resource management service(s) 402, the resource feed(s) 404, the gateway service(s) 406, the SaaS application(s) 408, and the identity provider 410 may be located within an on-premises data center of an organization for which the multi-resource access system 400 is deployed, within one or more cloud computing environments, or elsewhere.

Figure 4B:
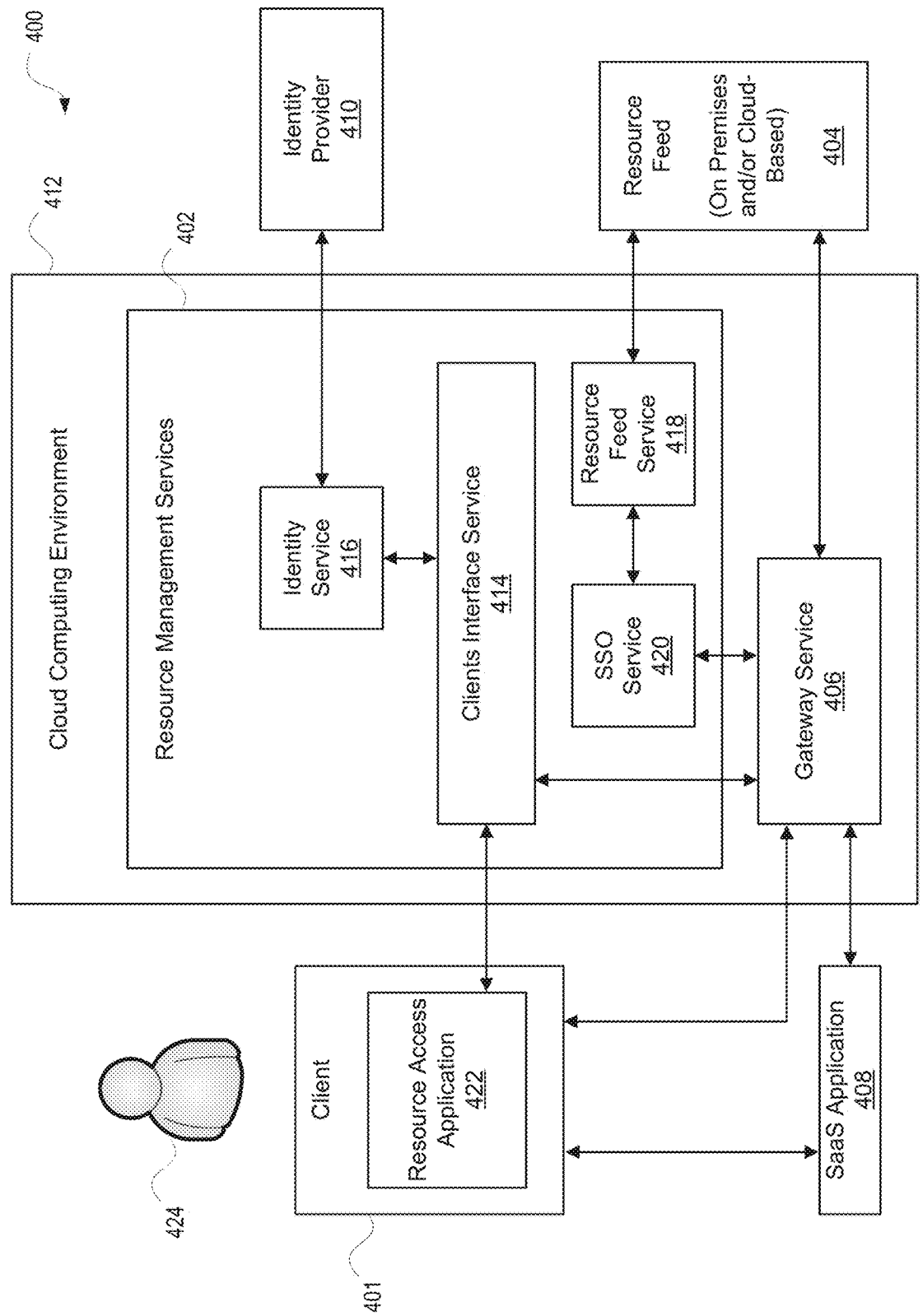
FIG. 4B depicts a block diagram showing an example implementation of the system shown in FIG. 4A in which various resource management services as well as a gateway service are located within a cloud computing environment.

FIG. 4B is a block diagram showing an example implementation of the multi-resource access system 400 shown in FIG. 4A in which various resource management services 402 as well as a gateway service 406 are located within a cloud computing environment 412. The cloud computing environment may, for example, include Microsoft Azure Cloud, Amazon Web Services, Google Cloud, or IBM Cloud. It should be appreciated, however, that in other implementations, one or more (or all) of the components of the resource management services 402 and/or the gateway service 406 may alternatively be located outside the cloud computing environment 412, such as within a data center hosted by an organization.

For any of the illustrated components (other than the client 401) that are not based within the cloud computing environment 412, cloud connectors (not shown in FIG. 4B) may be used to interface those components with the cloud computing environment 412. Such cloud connectors may, for example, run on Windows Server instances and/or Linux Server instances hosted in resource locations and may create a reverse proxy to route traffic between those resource locations and the cloud computing environment 412. In the illustrated example, the cloud-based resource management services 402 include a client interface service 414, an identity service 416, a resource feed service 418, and a single sign-on service 420. As shown, in some embodiments, the client 401 may use a resource access application 422 to communicate with the client interface service 414 as well as to present a user interface on the client 401 that a user 424 can operate to access the resource feed(s) 404 and/or the SaaS application(s) 408. The resource access application 422 may either be installed on the client 401, or may be executed by the client interface service 414 (or elsewhere in the multi-resource access system 400) and accessed using a web browser (not shown in FIG. 4B) on the client 401.

As explained in more detail below, in some embodiments, the resource access application 422 and associated components may provide the user 424 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 422 is launched or otherwise accessed by the user 424, the client interface service 414 may send a sign-on request to the identity service 416. In some embodiments, the identity provider 410 may be located on the premises of the organization for which the multi-resource access system 400 is deployed. The identity provider 410 may, for example, correspond to an on-premises Windows Active Directory. In such embodiments, the identity provider 410 may be connected to the cloud-based identity service 416 using a cloud connector (not shown in FIG. 4B), as described above. Upon receiving a sign-on request, the identity service 416 may cause the resource access application 422 (via the client interface service 414) to prompt the user 424 for the user's authentication credentials (e.g., user-name and password). Upon receiving the user's authentication credentials, the client interface service 414 may pass the credentials along to the identity service 416, and the identity service 416 may, in turn, forward them to the identity provider 410 for authentication, for example, by comparing them against an Active Directory domain. Once the identity service 416 receives confirmation from the identity provider 410 that the user's identity has been properly authenticated, the client interface service 414 may send a request to the resource feed service 418 for a list of subscribed resources for the user 424.

In other embodiments (not illustrated in FIG. 4B), the identity provider 410 may be a cloud-based identity service, such as a Microsoft Azure Active Directory. In such embodiments, upon receiving a sign-on request from the client interface service 414, the identity service 416 may, via the client interface service 414, cause the client 401 to be redirected to the cloud-based identity service to complete an authentication process. The cloud-based identity service may then cause the client 401 to prompt the user 424 to enter the user's authentication credentials. Upon determining the user's identity has been properly authenticated, the cloud-based identity service may send a message to the resource access application 422 indicating the authentication attempt was successful, and the resource access application 422 may then inform the client interface service 414 of the successfully authentication. Once the identity service 416 receives confirmation from the client interface service 414 that the user's identity has been properly authenticated, the client interface service 414 may send a request to the resource feed service 418 for a list of subscribed resources for the user 424.

The resource feed service 418 may request identity tokens for configured resources from the single sign-on service 420. The resource feed service 418 may then pass the feed-specific identity tokens it receives to the points of authentication for the respective resource feeds 404. The resource feeds 404 may then respond with lists of resources configured for the respective identities. The resource feed service 418 may then aggregate all items from the different feeds and forward them to the client interface service 414, which may cause the resource access application 422 to present a list of available resources on a user interface of the client 401. The list of available resources may, for example, be presented on the user interface of the client 401 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 401, and/or one or more SaaS applications 408 to which the user 424 has subscribed. The lists of local applications and the SaaS applications 408 may, for example, be supplied by resource feeds 404 for respective services that manage which such applications are to be made available to the user 424 via the resource access application 422. Examples of SaaS applications 408 that may be managed and accessed as described herein include Microsoft Office 365 applications, SAP SaaS applications, Workday applications, etc.

For resources other than local applications and the SaaS application(s) 408, upon the user 424 selecting one of the listed available resources, the resource access application 422 may cause the client interface service 414 to forward a request for the specified resource to the resource feed service 418. In response to receiving such a request, the resource feed service 418 may request an identity token for the corresponding feed from the single sign-on service 420. The resource feed service 418 may then pass the identity token received from the single sign-on service 420 to the client interface service 414 where a launch ticket for the resource may be generated and sent to the resource access application 422. Upon receiving the launch ticket, the resource access application 422 may initiate a secure session to the gateway service 406 and present the launch ticket. When the gateway service 406 is presented with the launch ticket, it may initiate a secure session to the appropriate resource feed and present the identity token to that feed to seamlessly authenticate the user 424. Once the session initializes, the client 401 may proceed to access the selected resource.

When the user 424 selects a local application, the resource access application 422 may cause the selected local application to launch on the client 401. When the user 424 selects a SaaS application 408, the resource access application 422 may cause the client interface service 414 to request a one-time uniform resource locator (URL) from the gateway service 406 as well a preferred browser for use in accessing the SaaS application 408. After the gateway service 406 returns the one-time URL and identifies the preferred browser, the client interface service 414 may pass that information along to the resource access application 422. The client 401 may then launch the identified browser and initiate a connection to the gateway service 406. The gateway service 406 may then request an assertion from the single sign-on service 420. Upon receiving the assertion, the gateway service 406 may cause the identified browser on the client 401 to be redirected to the logon page for identified SaaS application 408 and present the assertion. The SaaS may then contact the gateway service 406 to validate the assertion and authenticate the user 424. Once the user has been authenticated, communication may occur directly between the identified browser and the selected SaaS application 408, thus allowing the user 424 to use the client 401 to access the selected SaaS application 408.

In some embodiments, the preferred browser identified by the gateway service 406 may be a specialized browser embedded in the resource access application 422 (when the resource access application 422 is installed on the client 401) or provided by one of the resource feeds 404 (when the resource access application 422 is located remotely), e.g., via a secure browser service. In such embodiments, the SaaS applications 408 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 401 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 404) for assessment of its security risk by a web filtering service. For approved URLs, the specialized browser may be permitted to access the link. For suspicious links, however, the web filtering service may have the client interface service 414 send the link to a secure browser service, which may start a new virtual browser session with the client 401, and thus allow the user to access the potentially harmful linked content in a safe environment.

In some embodiments, in addition to or in lieu of providing the user 424 with a list of resources that are available to be accessed individually, as described above, the user 424 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 401 to notify a user 424 of something that requires the user's attention (e.g., approval of an expense report, new course available for registration, etc.).

Figure 4C:
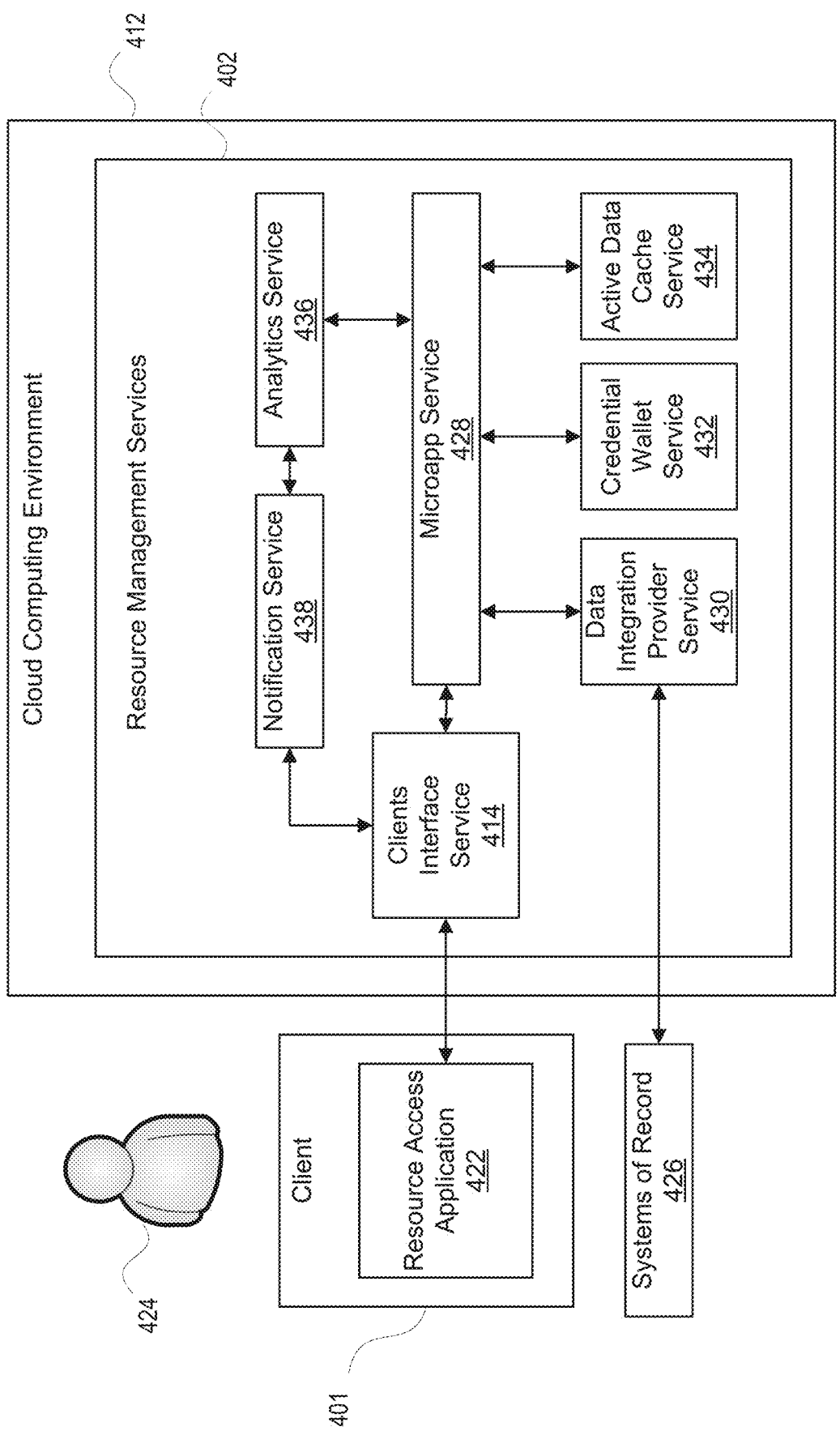
FIG. 4C depicts a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 426 labeled "systems of record," and further in which several different services are included within the resource management services block 402. As explained below, the services shown in FIG. 4C may enable the provision of a streamlined resource activity feed and/or notification process for a client 401. In the example shown, in addition to the client interface service 414 discussed above, the illustrated services include a microapp service 428, a data integration provider service 430, a credential wallet service 432, an active data cache service 434, an analytics service 436, and a notification service 438. In various embodiments, the services shown in FIG. 4C may be employed either in addition to or instead of the different services shown in FIG. 4B. Further, as noted above in connection with FIG. 4B, it should be appreciated that, in other implementations, one or more (or all) of the components of the resource management services 402 shown in FIG. 4C may alternatively be located outside the cloud computing environment 412, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 422 without having to launch the native application. The system shown in FIG. 4C may, for example, aggregate relevant notifications, tasks, and insights, and thereby give the user 424 a dynamic productivity tool. In some embodiments, the resource activity feed may be intelligently populated by utilizing machine learning and artificial intelligence (AI) algorithms. Further, in some implementations, microapps may be configured within the cloud computing environment 412, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 426 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 430, may, for example, support REST API, JSON, OData-JSON, and 6ML. As explained in more detail below, the data integration provider service 430 may also write back to the systems of record, for example, using OAuth2 or a service account.

In some embodiments, the microapp service 428 may be a single-tenant service responsible for creating the microapps. The microapp service 428 may send raw events, pulled from the systems of record 426, to the analytics service 436 for processing. The microapp service may, for example, periodically cause active data to be pulled from the systems of record 426.

In some embodiments, the active data cache service 434 may be single-tenant and may store all configuration information and microapp data. It may, for example, utilize a per-tenant database encryption key and per-tenant database credentials.

In some embodiments, the credential wallet service 432 may store encrypted service credentials for the systems of record 426 and user OAuth2 tokens.

In some embodiments, the data integration provider service 430 may interact with the systems of record 426 to decrypt end-user credentials and write back actions to the systems of record 426 under the identity of the end-user. The write-back actions may, for example, utilize a user's actual account to ensure all actions performed are compliant with data policies of the application or other resource being interacted with.

In some embodiments, the analytics service 436 may process the raw events received from the microapp service 428 to create targeted scored notifications and send such notifications to the notification service 438.

Finally, in some embodiments, the notification service 438 may process any notifications it receives from the analytics service 436. In some implementations, the notification service 438 may store the notifications in a database to be later served in an activity feed. In other embodiments, the notification service 438 may additionally or alternatively send the notifications out immediately to the client 401 as a push notification to the user 424.

In some embodiments, a process for synchronizing with the systems of record 426 and generating notifications may operate as follows. The microapp service 428 may retrieve encrypted service account credentials for the systems of record 426 from the credential wallet service 432 and request a sync with the data integration provider service 430. The data integration provider service 430 may then decrypt the service account credentials and use those credentials to retrieve data from the systems of record 426. The data integration provider service 430 may then stream the retrieved data to the microapp service 428. The microapp service 428 may store the received systems of record data in the active data cache service 434 and also send raw events to the analytics service 436. The analytics service 436 may create targeted scored notifications and send such notifications to the notification service 438. The notification service 438 may store the notifications in a database to be later served in an activity feed and/or may send the notifications out immediately to the client 401 as a push notification to the user 424.

In some embodiments, a process for processing a user-initiated action via a microapp may operate as follows. The client 401 may receive data from the microapp service 428 (via the client interface service 414) to render information corresponding to the microapp. The microapp service 428 may receive data from the active data cache service 434 to support that rendering. The user 424 may invoke an action from the microapp, causing the resource access application 422 to send an action request to the microapp service 428 (via the client interface service 414). The microapp service 428 may then retrieve from the credential wallet service 432 an encrypted Oauth2 token for the system of record for which the action is to be invoked, and may send the action to the data integration provider service 430 together with the encrypted OAuth2 token. The data integration provider service 430 may then decrypt the OAuth2 token and write the action to the appropriate system of record under the identity of the user 424. The data integration provider service 430 may then read back changed data from the written-to system of record and send that changed data to the microapp service 428. The microapp service 428 may then update the active data cache service 434 with the updated data and cause a message to be sent to the resource access application 422 (via the client interface service 414) notifying the user 424 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 422 or directly from another resource, such as Microsoft Teams. This feature may allow employees to work efficiently, stay organized, and deliver only the specific information they're looking for.

Figure 5:
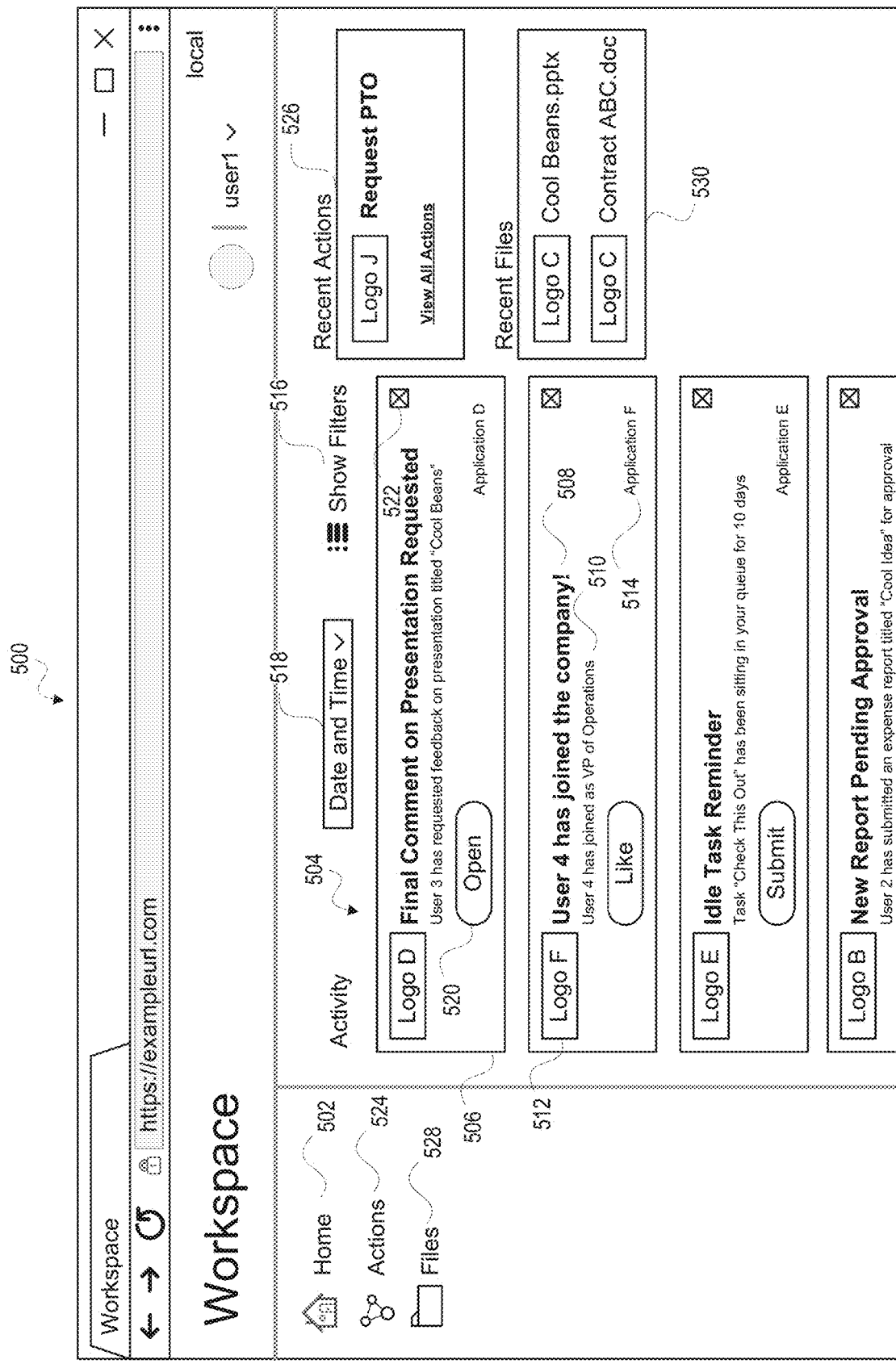
FIG. 5 depicts how a display screen may appear when an intelligent activity feed feature of a multi-resource management system, such as that shown in FIG. 4C, is employed.

FIG. 5 shows how a display screen 500 presented by a resource access application 422 (shown in FIG. 4C) may appear when an intelligent activity feed feature is employed and a user is logged on to the system. Such a screen may be provided, for example, when the user clicks on or otherwise selects a "home" user interface element 502. As shown, an activity feed 504 may be presented on the screen 500 that includes a plurality of notifications 506 about respective events that occurred within various applications to which the user has access rights. An example implementation of a system capable of providing an activity feed 504 like that shown is described above in connection with FIG. 4C. As explained above, a user's authentication credentials may be used to gain access to various systems of record (e.g., SalesForce®, Ariba®, Concur®, RightSignature®, etc.) with which the user has accounts, and events that occur within such systems of record may be evaluated to generate notifications 506 to the user concerning actions that the user can take relating to such events. As shown in FIG. 5, in some implementations, the notifications 506 may include a title 508 and a body 510, and may also include a logo 512 and/or a name 514 of the system or record to which the notification 506 corresponds, thus helping the user understand the proper context with which to decide how best to respond to the notification 506. In some implementations, one of more filters may be used to control the types, date ranges, etc., of the notifications 506 that are presented in the activity feed 504. The filters that can be used for this purpose may be revealed, for example, by clicking on or otherwise selecting a "show filters" user interface element 516. Further, in some embodiments, a user interface element 518 may additionally or alternatively be employed to select a manner in which the notifications 506 are sorted within the activity feed. In some implementations, for example, the notifications 506 may be sorted in accordance with the "date and time" they were created (as shown for the element 518 in FIG. 5) and/or an "application" mdde (not illustrated) may be selected (e.g., using the element 518) in which the notifications 506 may be sorted by application type.

When presented with the activity feed 504, the user may respond to the notifications 506 by clicking on or otherwise selecting a corresponding action element 520 (e.g., "Approve," "Reject," "Open," "Like," "Submit," etc.), or else by dismissing the notification, e.g., by clicking on or otherwise selecting a "close" element 522. As explained in connection with FIG. 4C above, the notifications 506 and corresponding action elements 522 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 506 (e.g., in a separate, pop-up window corresponding to the microapp) by clicking on or otherwise selecting a portion of the notification 506 other than one of the user-interface elements 520, 522. In some embodiments, the user may additionally or alternatively be able to select a user interface element either within the notification 506 or within a separate window corresponding to the microapp that allows the user to launch the native application to which the notification relates and respond to the event that prompted the notification via that native application rather than via the microapp. In addition to the event-driven actions accessible via the action elements 520 in the notifications 506, a user may alternatively initiate microapp actions by selecting a desired action, e.g., via a drop-down menu accessible using an "actions" user-interface element 524 or by selecting a desired action from a list 526 of recently and/or commonly used microapp actions. As shown, the user may also access files (e.g., via a Citrix ShareFile™ platform) by selecting a desired file, e.g., via a drop-down menu accessible using the "files" user interface element 528 or by selecting a desired file from a list 530 of recently and/or commonly used files.

Although not shown in FIG. 5, it should be appreciated that, in some implementations, additional resources may also be accessed through the screen 500 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops® service) by clicking on or otherwise selecting a "desktops" user-interface element (not shown) to reveal a list of accessible desktops.

The activity feed shown in FIG. 5 provides significant benefits, as it allows a user to respond to application-specific events generated by disparate systems of record without needing to navigate to, launch, and interface with multiple different native applications.

Searching Based on User Intentions

Figure 6:
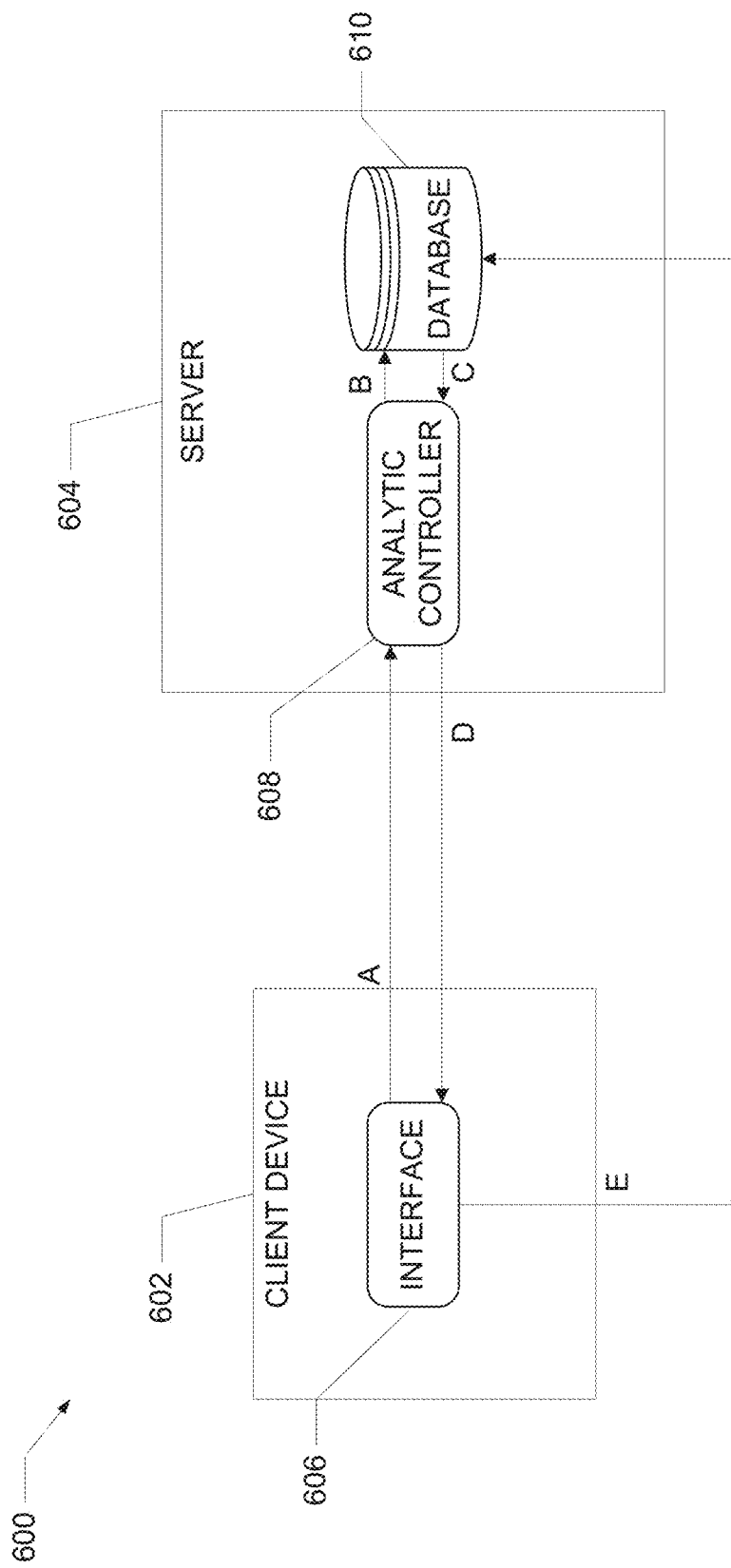
FIG. 6 depicts an illustrative system flow that may be used in accordance with one or more illustrative aspects described herein.

In some examples, users operating a client device may want to search for a particular application for performing an action, but may be unfamiliar with the name(s) of the application(s) dedicated to performing that action. In some examples, users may be aware of one or more applications for performing a particular action, but may be unaware which application is best, which application is preferred among colleagues, and/or which applications are preferred within an organization. In some examples, the applications the user wants to use may be local to the client device. In some examples, the applications may be remote, virtual, or cloud based applications. As described herein, one or more techniques may run on the client device or a remote server to facilitate identification of one or more applications for performing the action described by the user. FIG. 6 depicts an example system flow 600 illustrating interactions between a client device 602 and a server 604. The client device 602 may be any one of the client devices 107, 109 240, 311-314 described with respect to FIGS. 1-3. The client device 602 may comprise an interface 606 for interfacing with users and communicating with the server 604. The interface 606 may be similar to the APIs and/or one or more customer console applications with user interfaces from the management server 310 (FIG. 3). For example, the interface 606 may be a client device application local to the device or cloud based. The interface 606 may communicate with the server 604 via an analytic controller 608. The analytic controller 608 may query a database 610 based on one or more communications from the interface 606 of the client device 602.

In some examples, rather than input an application's name, a user of the client device 602 may utilize the interface 606 to input data such as a description of an action that a user intends to perform using one or more applications. For example, a user may input a description such as "I want to schedule a meeting" indicating the user's intent to perform the action of scheduling a meeting with an application. Other such descriptions may be input such as, for example, "I want to send an email," "I want to chat," "I want to make a spreadsheet," "I want to write a letter," "I want to build a database," "I want to apply for reimbursement," "I want to take leave," "I want to draw a workflow," or "I want to connect to a remote network." The interface 606 may send the user's description to the analytic controller 608 of the server 604 (identified by arrow "A" in FIG. 6). The analytic controller 608 of the server 604 may receive the user's description and may query the database 610 (identified by arrow "B" in FIG. 6), which may store one or more mappings, assignments or other associations between prior user descriptions and applications. The database 610 may return, to the analytic controller 608, the prior user descriptions and applications (identified by arrow "C" in FIG. 6). The analytic controller 608 may analyze the user's description, the prior user descriptions, and the corresponding applications to determine one or more applications relevant to the user's description of the action that the user intends to perform. The analytic controller 608 may rank, list or otherwise prioritize the one or more applications. The analytic controller 608 may further determine usage percentages of the one or more applications. The analytic controller 608 may send the one or more applications, their rankings, and their usage percentages to the interface 606 (identified by arrow "D" in FIG. 6). The interface 606 may receive the one or more applications, their rankings, and their usage percentages and may present the one or more applications to a user. The user of the client device 602 may select an application, from the one or more applications, to complete the action that the user intended to perform. Based on the selection, the interface 606 may generate a new mapping between 1) the description of the action that the user intended to perform and 2) the selected application. The interface 606 may send the new mapping to the database 610 for storage for use in subsequent application searches (identified by arrow "E" in FIG. 6).

Figure 7:
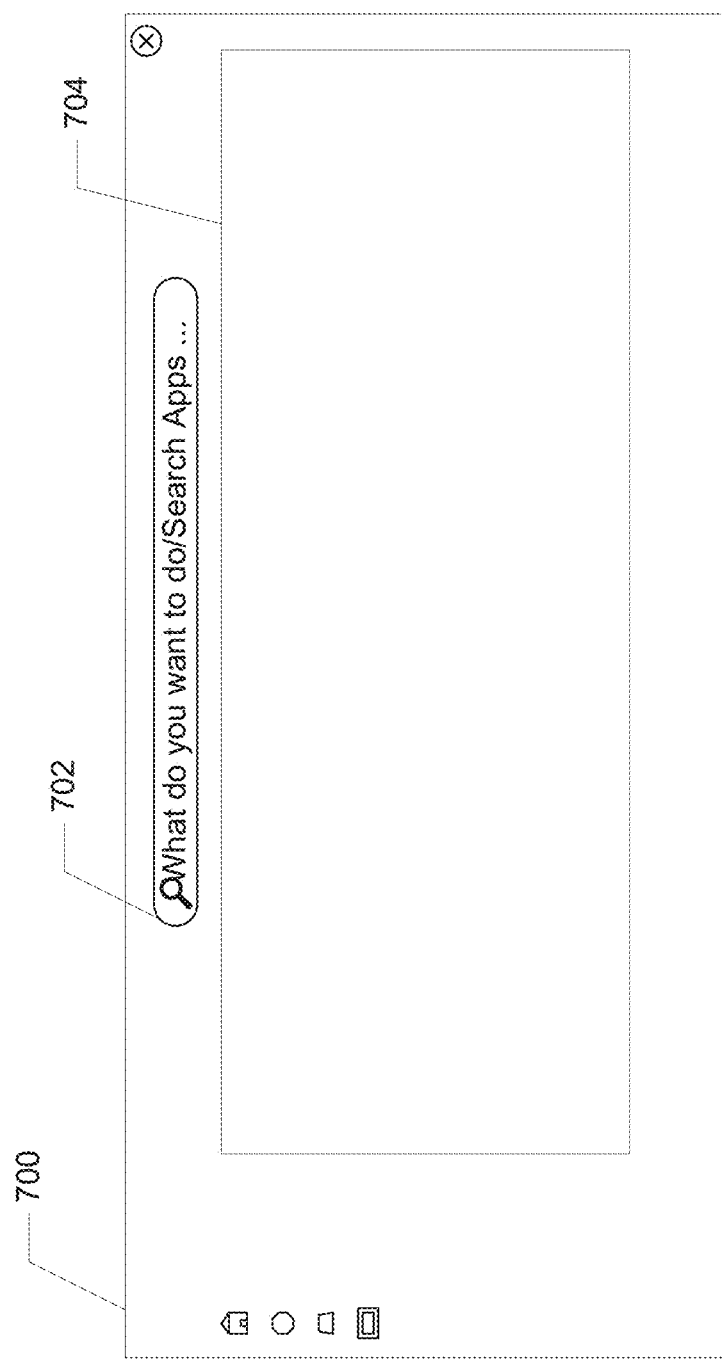
FIG. 7 depicts an illustrative user interface that may be used in accordance with one or more illustrative aspects described herein.
Figure 8:
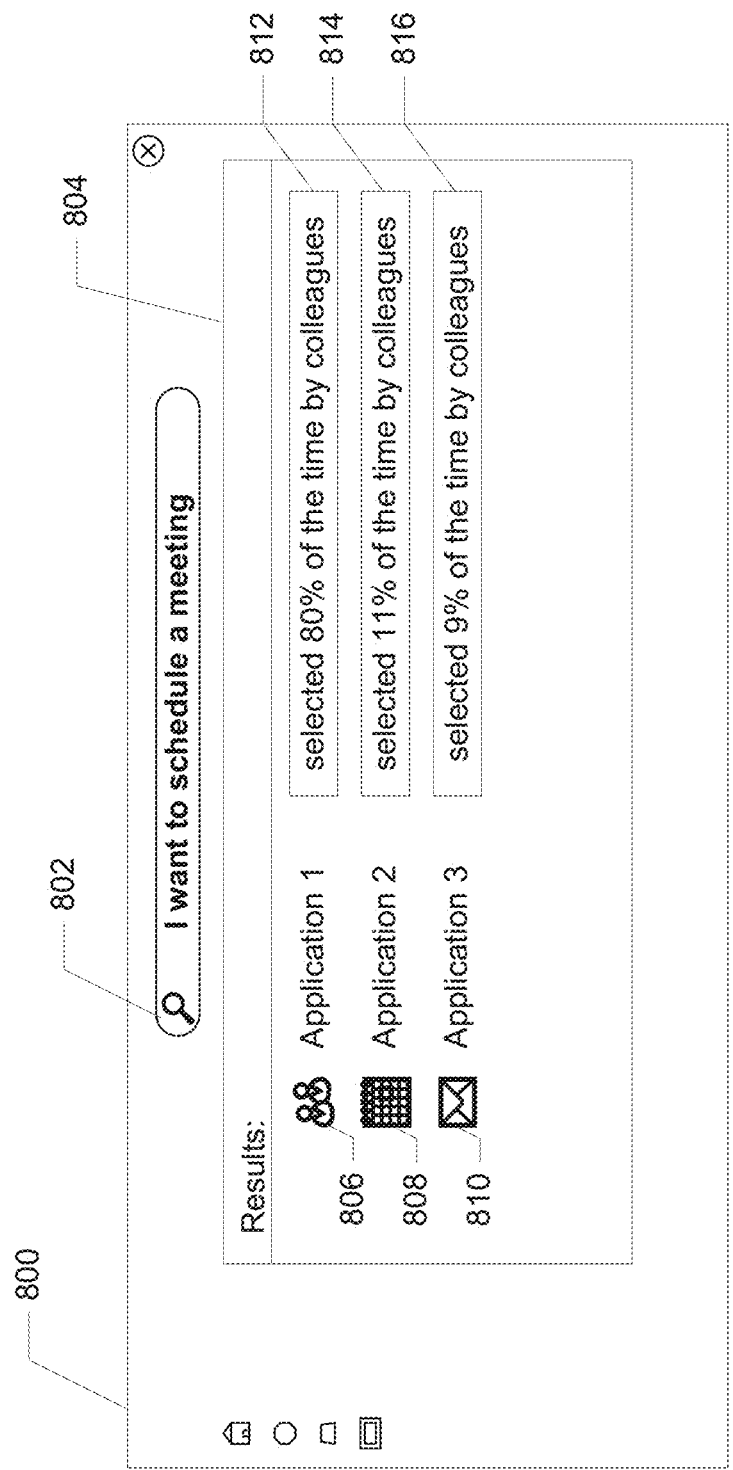
FIG. 8 depicts another illustrative user interface that may be used in accordance with one or more illustrative aspects described herein.

FIGS. 7-8 illustrate example windows that the interface 606 may utilize for user interaction. For example, FIG. 7 illustrates an example window 700 that the interface 606 may present to a user prior to receipt of input from a user. The window 700 may include an input field 702 and a display window 704. The input field 702 may enable a user to input either the name of an application that the user intends to use to perform an action, if known, or a description of the action that the user intends to perform. Although the description herein relates to searching for an application based on a description of the action that the user intends to perform, the techniques disclosed herein may be equally applicable to searching for applications based on an application name. Additionally, the techniques disclosed herein may be equally applicable to documents, web pages, files, folders, templates, records, or other data. As illustrated in FIG. 7, default text may appear to inform a user that he or she may search for applications using the input field 702. For example, the input field 702 may include the default text "What do you want to do/Search Apps . . . ."

FIG. 8 illustrates an example window 800 that the interface 606 may present to a user after the user has utilized the input field 702 of the example window 700. For example, within an input field 802, a user may have input the description of an action: "I want to schedule a meeting." In view of the description above, with respect to FIG. 6, the interface 606 may send the user's description input via the input field 802 to the analytic controller 608 of the server 604. The interface 606 may receive, from the analytic controller 608, one or more applications, their rankings, and their usage percentages. A display window 804 may present, to the user, the one or more applications ranked in accordance with their usage percentages. For example, the display window 804 may present a first application 806, a second application 808, and a third application 810. The display window 804 may further present a first usage percentage 812, a second usage percentage 814, and a third usage percentage 816. As illustrated in FIG. 8, the first application 806 may be associated with the first usage percentage 812, which may indicate that the first application 806 has been selected 80% of the time by colleagues for the particular action that the user intended to perform. The second application 808 may be associated with the second usage percentage 814, which may indicate that the second application 808 has been selected 11% of the time by colleagues for the particular action that the user intended to perform. The third application 810 may be associated with the third usage percentage 816, which may indicate that the third application 810 has been selected 9% of the time by colleagues for the particular action that the user intended to perform.

From this presentation, a user may be able to identify one or more applications to perform the action that user described, without the user having identified the names of the one or more applications. Even further, a user may be able to identify, which application, of the one or more applications, is used the most (e.g., by their colleagues). As a result, a user may be able to locate applications for better collaboration within an organization.

As an example, the first application 806 may be Microsoft Teams, the second application 808 may be GoToMeetings, and the third application 810 may be Outlook. For a first user intending to schedule a meeting with one or more colleagues, it may be important to utilize the application that the one or more colleagues are using. Otherwise, the first user may be, for example, using the second application 808 (e.g., GoToMeetings) for meetings while a second user may be using the first application 806 (e.g., Microsoft Teams) for meetings. In such an example, the first and second users may have difficulty scheduling and/or attending a meeting between themselves. Based on the description above with respect to FIG. 6, however, the first user may be presented, based on a search requesting applications for scheduling meetings, the first application 806, the second application 808, and the third application 810. The first user may further be presented the first usage percentage 812, the second usage percentage 814, and the third usage percentage 816, which may indicate the first application 806 (e.g., Microsoft Teams) is used by a majority of the first user's colleagues (e.g., 80%). The first user may choose an application, based on the presentation of the first usage percentage 812, the second usage percentage 814, and the third usage percentage 816, which may result in more users selecting the same application (e.g., the one presented with the highest usage presentation) a majority of the time. With a majority of users selecting a same application a majority of the time, any difficulty scheduling and/or attending a meeting may be reduced. While the above description relates to scheduling/attending a meeting, the above description is applicable to any action a user intends to perform using one or more applications.

Figure 9:
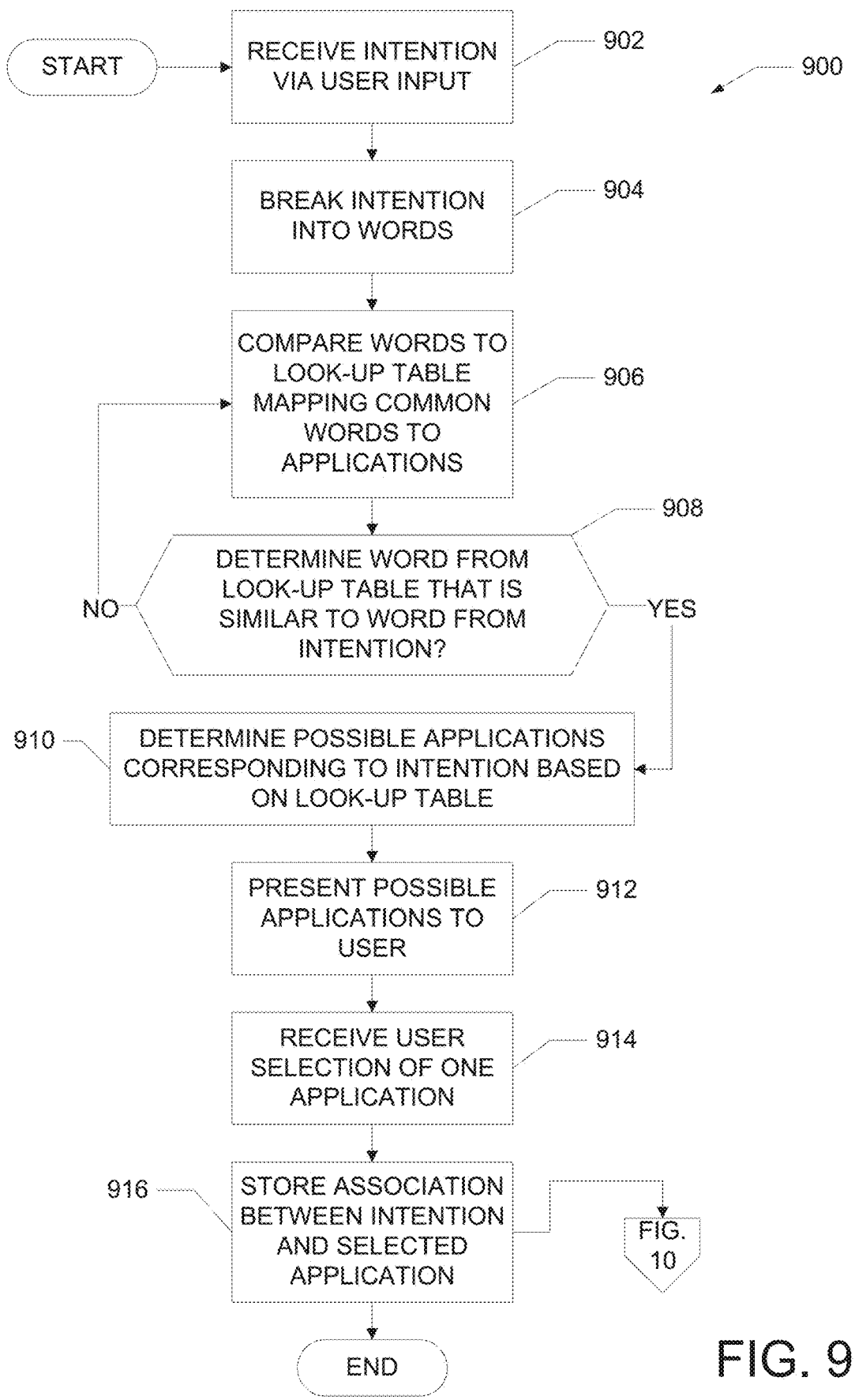
FIG. 9 depicts an illustrative flow diagram of a method that may be used in accordance with one or more illustrative aspects described herein.
Figure 10:
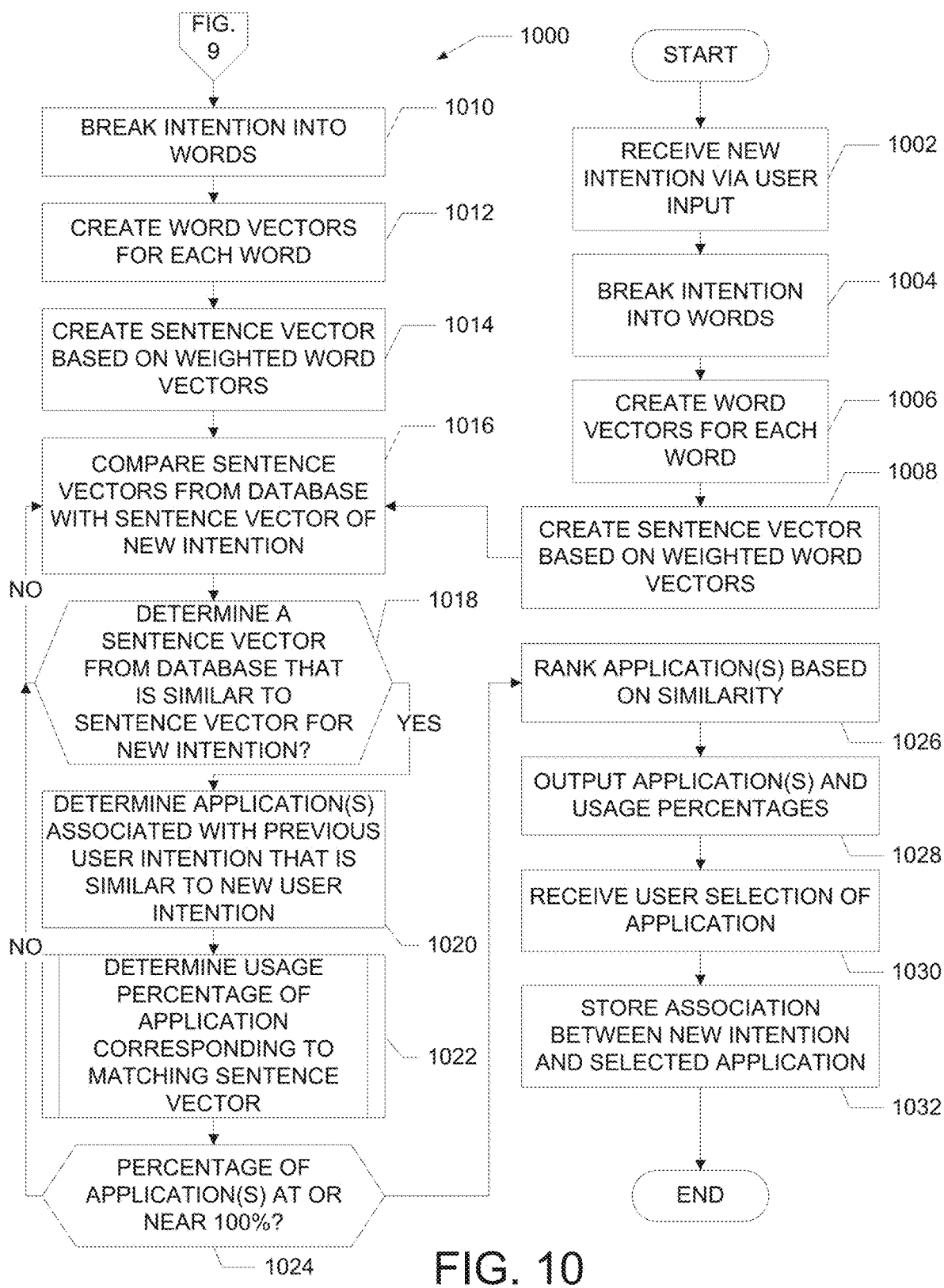
FIG. 10 depicts another illustrative flow diagram of a method that may be used in accordance with one or more illustrative aspects described herein.
Figure 11:
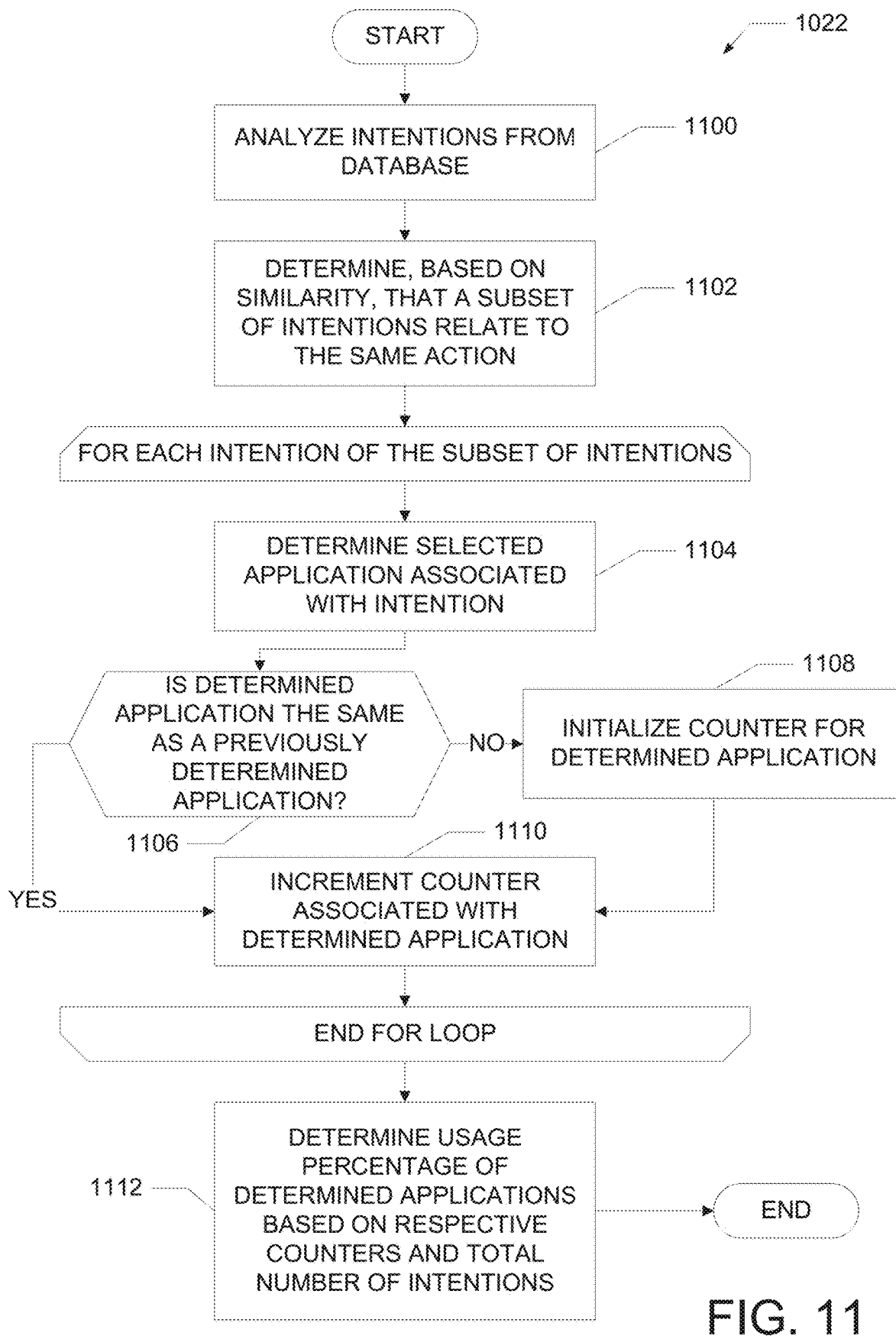
FIG. 11 depicts another illustrative flow diagram of a method that may be used in accordance with one or more illustrative aspects described herein.

The following exemplary techniques set forth in FIGS. 9-11 illustrates the process described above with reference to FIGS. 6-8 in more detail. For example, FIG. 9 illustrates an example method 900 for initializing associations between queries based on user intentions to perform an action and respective applications for carrying out the user's intention to perform the action. The example method 900 of FIG. 9 may begin with the analytic controller 608 receiving a query based on a user intention that is input by a user (902). As an example, the interface 606 of the client device 602 may be utilized by the user to input the user intention (e.g., via the input field 702, 802 of the window 700, 800) to perform an action via one or more applications. The interface 606 may send the user intention to perform the action to the analytic controller 608. The analytic controller 608 may break, divide, split, or otherwise separate the user intention into one or more words based on, for example, spaces, tabs, returns, punctuation, or other white space (904). The analytic controller 608 may access the database 610 to obtain a look-up table mapping words to known applications. For example, table 1 below illustrates example words that may be mapped to example applications:

TABLE 1

| Words | Known Applications |
|---|---|
| Meet, Meeting, Appointment, Call, Video Call, Conference, Video Conference, Presentation, Discussion, Roundtable | Outlook, Microsoft Teams, GoToMeeting, Zoom |
| Spreadsheet, Graph, Chart | Microsoft Excel, Google Sheets |
| Word Processor, Document, Write, Draft | Microsoft Word, Google Doc |
| Reimburse, Reimbursement, Purchase, Logistics | SAP, Oracle NetSuite |
| OA | Workday, Oracle |

The analytic controller 608 may compare the words of the user intention to words within the look-up table (906) using any number of similarity techniques (e.g., identical matching, hamming distance, cosine similarity, Euclidean distance, Pearsons Correlation, etc.). If the analytic controller 608 does not determine a word from the look-up table that is similar to a first word from the user intention (908: NO), the analytic controller 608 may continue to compare other words from the user intention (e.g., incrementally parse words of the user intention) to words within the look-up table (806). If the analytic controller 608 does determine a word from the look-up table that is similar to at least one word from the user intention (908: YES), then the analytic controller 608 may determine, based on the mapping of the look-up table, one or more possible applications corresponding to the user intention (910). The analytic controller 608 may output the one or more possible applications to the client device 602 for presentation to the user via the interface 606. The analytic controller 608 may receive, from the client device 602, an indication of a user's selection of an application from the one or more possible applications (914). The analytic controller 608 may store, within the database 610, an association between the user intention received at step 902 and the selected application identified in the indication received at step 914 (916). The stored associations may be referred to as records. Thereafter, the method 900 may end. The method 900 may run any number of times. In some examples, the method 900 is run until a threshold number of records (e.g., associations between user intentions and applications) have been stored in the database 610. The record(s) resulting from the method 900 may be stored, for example, for future use in an example method 1000 described below with reference to FIG. 10.

The example method 1000 may output, based on queries including a user's intention to perform an action, application(s) for carrying out the user's intention. The example method 1000 of FIG. 10 may begin with the analytic controller 608 receiving a query based on a new user intention that is input by a user (1002). The analytic controller 608 may break, divide, split, or otherwise separate the new user intention into one or more words based on, for example, spaces, tabs, returns, punctuation, or other white space (1004). The analytic controller 608 may create, for each word of the new user intention, word vectors (1006). An example word vector may look like: {word1: [V1], word2: [V2], . . . }. To create the word vectors, the analytic controller 608 may use neural network models or other machine learning techniques to develop word associations. For example, the analytic controller 608 may use the Word2vec technique for creating word vectors. The analytic controller 608 may use data (e.g., pretrained word vectors) in developing word vectors for the words of the new user intention. In some examples, a word vector, created by the analytic controller 608, may comprise several hundred dimensions such as, for example, three hundred dimensions.

Once the analytic controller 608 has created a word vector for individual words of the new user intention, the analytic controller 608 may create a sentence vector (1008). In some examples, the analytic controller 608 weights the words in the new user intention such as, for example, by the frequency of words in the new user intention, when creating the sentence vector. For example, if the new user intention is "I want to schedule a meeting," individual words of the input may have a weight of "⅙." In some examples, there may be words in the new user intention that may not be relevant. For example, the words "I want to" in the above example user intention of "I want to schedule a meeting" may not be relevant for determining the action that the user intends to perform. Rather, the words "schedule a meeting" may be more relevant. In some examples, a stop words list may be used to filter out common words such as "I," "want," "to," "a," "the," "is," "at," "which," or "on." Any number of words may be added to the stop words list such that only the most relevant words in a user intention are used for searching for applications as described herein. Using only relevant words reduces the processing requirements of the techniques described herein because less word vectors may be generated and less comparisons may occur. In examples where a stop words list is used to reduce the above example user intention of "I want to schedule a meeting" to "schedule meeting," the weight of the words may become "½" rather than "⅙."

The analytic controller 608 may use the following formula in determining the sentence vector:

$$v_s = \frac{1}{|s|} \sum_i^{|s|} \frac{a}{a + p(w_i)} v_{w_i}$$

where "s" is the length of the user intention, "a" is a constant, "$p(w_i)$" is an estimated probabilities $\{p(w): w \in V\}$ of the words of the user intention, and "$v_{w_i}$" is the word vector for individual words of the user intention. In some examples, "$v_{w_i}$" may include the pretrained word vectors. In some examples, the analytic controller 608 may use the Sentence2vec technique for determining the sentence vector.

The analytic controller 608 may access the database 610 to receive the stored associations or records between previous user intentions and applications. The analytic controller 608 may perform similar analysis on the previous user intentions, from the stored associations or records, as described above with reference to steps 1004-1008. For example, the analytic controller 608 may break, divide, split, or otherwise separate the previous user intentions into one or more words (1010). The analytic controller 608 may create, for individual words of the previous user intentions, word vectors (1012). Once the analytic controller 608 has created a word vector for each word of the previous user intentions, the analytic controller 608 may create a sentence vector (1014) for previous user intentions. In some examples, steps 1010-1014 may be performed prior to steps 1004-1008. In some examples, steps 1010-1014 may be performed after steps 1004-1008. In some examples, the analytic controller 608 may perform steps 1010-1014 in parallel with steps 1004-1008. Once sentence vectors have been created for previous user intentions and the new user intention, the user intentions and sentence vectors may be correlated as follows: {intention1: [Vs1], intention2: [Vs2], . . . , new-intention: [New-Vs]}.

The analytic controller 608 may compare the sentence vectors created for previous user intentions from step 1014 with the sentence vector created for the new user intention from step 1008 (1016). The analytic controller 608 may compare the sentence vectors of the previous user intentions with the sentence vector created for the new user intention using any number of similarity techniques (e.g., identical matching, hamming distance, cosine similarity, Euclidean distance, Pearsons Correlation, etc.). If the analytic controller 608 does not determine a sentence vector for the previous user intentions that is similar to the sentence vector for the new user intention (1018: NO), then the analytic controller 608 may continue to compare other sentence vectors for the previous user intentions (e.g., incrementally comparing sentence vectors of the previous user intentions) to the sentence vector for the new user intention (1016). In some examples, the loop formed from steps 1018 and 1016 may be eliminated based on the similarly matching techniques used. For example, using Cosine Similarity, the similarity comparison may result in similarities for all of the sentence vectors at once: {result1: COS(Vs1, New-Vs), result2: COS(Vs2, New-Vs),}. If the analytic controller 608 does determine a sentence vector for the previous user intentions that is similar to the sentence vector for the new user intention (1018: YES), then the analytic controller 608 may determine, based on the sentence vector for the previous user intentions that is similar to the sentence vector for the new user intention and based on the stored records (e.g., associations between the previous user intentions and applications), one or more possible applications corresponding to the new user intention (1020).

In some examples, the analytic controller 608 may determine, for one or more possible applications, a usage percentage (using a subroutine 1022). If the analytic controller 608 determines that a sum of the usage percentages of one or more possible applications is not at or near 100% (1024: NO), then the analytic controller 608 may determine that not all possible applications have been found and may continue to compare other sentence vectors for the previous user intentions (e.g., incrementally comparing sentence vectors of the previous user intentions) to the sentence vector for the new user intention (1016). In some examples, usage percentages may be determined concurrently (rather than incrementally) for all of the one or more possible applications. If the analytic controller 608 determines that the sum of the usage percentages of the one or more possible applications is at or near 100% (1024: YES), then the analytic controller 608 may determine that all possible applications have been located. The analytic controller 608 may rank the one or more possible applications based on their degree of similarity (1026). For example, the analytic controller 608 may sort the results of the one or more applications in descending order based on the results of the similarity comparison of step 1018. The analytic controller 608 may output, to the client device 602 for presentation to a user, the one or more possible applications and the usage percentages of each of the one or more possible applications (1028). As an example, the top three applications may be presented to the user. The one or more possible applications may be output to the client device 602 in an order according to their similarity ranking. The analytic controller 608 may receive, from the client device 602, an indication of a user's selection of an application from the one or more possible applications (1030). The analytic controller 608 may store, within the database 610, an association between the new user intention received at step 1002 and the selected application identified in the indication received at step 1030 (1032) (e.g., a new record). Thereafter, the method 1000 may end. The method 1000 may run any number of times.

The analytic controller 608 may determine the usage percentages of the one or more possible applications using the subroutine 1022 of FIG. 10, further described with reference to FIG. 11. The analytic controller 608 may access the database 610 to receive the stored records (e.g., associations between previous user intentions and applications). The analytic controller 608 may analyze the previous user intentions and the associated applications (1100). The analytic controller 608 may determine, based on comparing previous user intentions for similarity, that a subset of the previous user intentions correspond to a same action (1102). As discussed above, any number of similarity techniques (e.g., identical matching, hamming distance, cosine similarity, Euclidean distance, Pearsons Correlation, etc.) may be used to determine which previous user intentions correspond to a same action. As an example, one user intention may be "schedule an appointment" and another user intention may be "schedule a meeting" and the analytic controller 608 may determine that although the user intentions are written in different ways, the user intentions are similar (e.g., appointment being a synonym of meeting) and the user intentions intend to perform a same action.

Users searching for applications to perform a same action may end up selecting different applications for performance of that action. For example, a user searching for an application to "schedule an appointment" may select a different application from a user searching for an application to "schedule a meeting." Also, a user searching for an application to "schedule a meeting" may select a different application from another user searching for an application to "schedule a meeting." Accordingly, the analytic controller 608 may determine how many times each user intending to perform an action selects a particular application for performing that action. For example, the analytic controller 608 may determine, for previous user intention from the subset of the previous user intentions, which application is stored in association with that previous user intention (1104) based on the stored records. If the analytic controller 608 determines that the application stored in association with a respective previous user intention is not a same application from a previously determined application (1106: NO), the analytic controller 608 may initialize a counter (e.g., counter=0) for the respective previous user intention (1108). If the analytic controller 608 determines that the application stored in association with a respective previous user intention is the same application as a previously determined application (1106: YES) or after the analytic controller 608 initializes a counter (for the respective previous user intention (1108), the analytic controller 608 may increment the counter (e.g., counter=counter+1) for the respective previous user intention. As discussed above, the steps 1104-1110 may be performed for previous user intentions of the subset of user intentions identified in step 1102. In this way, the analytic controller 608 may count how many of the subset of the previous user intentions that correspond to the same action are associated with a first application, are associated with a second application, are associated with a third application, and so on and so forth.

Based on the respective counters and the total number of previous user intentions of the subset of user intentions, the analytic controller 608 may determine the usage percentages of the applications associated with the subset of the previous user intentions that correspond to the same action. As an example, the analytic controller 608 may determine that 100 previous user intentions correspond to the same action (e.g., schedule a meeting). However, the analytic controller 608 may determine that of those 100 previous user intentions, 80 of the previous user intentions correspond to a first application (e.g., Microsoft Teams), 11 of the previous user intentions correspond to a second application (e.g., GoToMeeting), and 9 of the previous user interactions correspond to a third application (e.g., Outlook). The analytic controller 608 may thus determine a first usage percentage of 80/100=80%, a second usage percentage of 11/100=11%, and a third usage percentage of 9/100=9%. Thereafter, the subroutine 1022 may end. The subroutine 1022 may run any number of times.

The above description may be applicable in various applications and using a wide variety of data. In some examples, all user interactions from an organization may be used. In some examples, only a subset of user interactions from the organization may be used, such as, for example, user interactions from an internal group within the organization. It will be apparent that the results of the searching techniques disclosed herein my change based on which set of user interactions are used. For example, although a majority of users within an organization use a first application a majority of the time, a minority of users within the organization may use a second application a majority of the time.

The following paragraphs (M1) through (M8) describe examples of methods that may be implemented in accordance with the present disclosure.

(M1) A method comprising receiving, by a computing device, data indicative of an intent of a user to perform an action via at least one application, the data comprising a description of the action that is input into a client device, identifying, by the computing device, the at least one application based on a comparison of the description of the action and one or more records, the one or more records being indicative of prior intents of one or more users to perform actions and indicative of at least one selection by the one or more users to perform the actions with a selected application, and providing, by the computing device, output to the client device to enable performance of the action via the at least one application.

(M2) A method may be performed as described in paragraph (M1), further comprising determining, based on the description of the action, a word vector for each word in the description of the action, wherein the word vector for each word in the description of the action comprises three hundred dimensions, and determining, based on weighting the word vector for each word, a sentence vector for the description of the action.

(M3) A method may be performed as described in any of paragraphs (M1) through (M2) wherein determining the sentence vector for the description of the action comprises determining a frequency of each word in the description of the action.

(M4) A method may be performed as described in any of paragraphs (M1) through (M3) wherein identifying the at least one application based on the comparison of the description of the action and the one or more records comprises calculating, for a plurality of sentence vectors associated with previously searched actions, a cosine similarity between the sentence vector for the description of the action and each sentence vector of the plurality of sentence vectors associated with previously searched actions, determining, based on the cosine similarity for the plurality of sentence vectors associated with the previously searched actions, applications previously correlated to the previously searched actions, and ranking the applications previously correlated to the previously searched actions.

(M5) A method may be performed as described in any of paragraphs (M1) through (M4) wherein the one or more records are stored in a database, the method further comprising receiving, from the client device, an indication of a selected application from the at least one application, and storing, in the database, a correlation between the description of the action and the selected application.

(M6) A method may be performed as described in any of paragraphs (M1) through (M5) further comprising determining, for each of the at least one application, a frequency of use, and providing output to the client device to enable presentation of the frequency of use for each of the at least one application.

(M7) A method may be performed as described in any of paragraphs (M1) through (M6) further comprising accessing a look-up table associating words with applications, and determining a correspondence, based on the look-up table, between at least one record of the one or more records and an application.

(M8) A method may be performed as described in any of paragraphs (M1) through (M7) wherein the one or more records are a subset of records associated with previously searched action from an organization.

The following paragraphs (A1) through (A8) describe examples of apparatuses that may be implemented in accordance with the present disclosure.

(A1) An apparatus comprising one or more processors, and memory storing instructions that, when executed by the one or more processors, cause the apparatus to: receive data indicative of an intent of a user to perform an action via at least one application, the data comprising a description of the action that is input into a client device, identify the at least one application based on a comparison of the description of the action and one or more records, the one or more records being indicative of prior intents of one or more users to perform actions and indicative of at least one selection by the one or more users to perform the actions with a selected application, and provide output to the client device to enable performance of the action via the at least one application.

(A2) An apparatus as described in paragraph (A1), wherein the instructions, when executed by the one or more processors, further cause the apparatus to: determine, based on the description of the action, a word vector for each word in the description of the action, wherein the word vector for each word in the description of the action comprises three hundred dimensions, and determine, based on weighting the word vector for each word, a sentence vector for the description of the action.

(A3) An apparatus as described in any of paragraphs (A1) through (A2), wherein the instructions, when executed by the one or more processors, further cause the apparatus to determine a frequency of each word in the description of the action.

(A4) An apparatus as described in any of paragraphs (A1) through (A3), wherein the instructions, when executed by the one or more processors, further cause the apparatus to: calculate, for a plurality of sentence vectors associated with previously searched actions, a cosine similarity between the sentence vector for the description of the action and each sentence vector of the plurality of sentence vectors associated with previously searched actions, determine, based on the cosine similarity for the plurality of sentence vectors associated with the previously searched actions, applications previously correlated to the previously searched actions, and rank the applications previously correlated to the previously searched actions.

(A5) An apparatus as described in any of paragraphs (A1) through (A4), wherein the one or more records are stored in a database, and wherein the instructions, when executed by the one or more processors, further cause the apparatus to: receive, from the client device, an indication of a selected application from the at least one application, and store, in the database, a correlation between the description of the action and the selected application.

(A6) An apparatus as described in any of paragraphs (A1) through (A5), wherein the instructions, when executed by the one or more processors, further cause the apparatus to: determine, for each of the at least one application, a frequency of use, and provide output to the client device to enable presentation of the frequency of use for each of the at least one application.

(A7) An apparatus as described in any of paragraphs (A1) through (A6), wherein the instructions, when executed by the one or more processors, further cause the apparatus to: access a look-up table associating words with applications, and determine a correspondence, based on the look-up table, between at least one record of the one or more records and an application.

(A8) An apparatus as described in any of paragraphs (A1) through (A7), wherein the one or more records are a subset of records associated with previously searched action from an organization.

The following paragraphs (S1) through (S4) describe examples of systems that may be implemented in accordance with the present disclosure.

(S1) A system comprising a first device comprising one or more first processors and first memory, a second device comprising one or more second processors and second memory, wherein the first memory stores first instructions that, when executed by the one or more first processors, cause the first device to: receive data indicative of an intent of a user to perform an action via at least one application, the data comprising a description of the action, identify the at least one application based on a comparison of the description of the action and one or more records, the one or more records being indicative of prior intents of one or more users to perform actions and indicative of at least one selection by the one or more users to perform the actions with a selected application, and provide, to the second device, output to enable performance of the action via the at least one application, and wherein the second memory stores second instructions that, when executed by the one or more second processors, cause the second device to: determine, based on user input, the description of the action, send, to the first device, the description of the action, receive, from the first device, the output to enable performance of the action via the at least one application, and present the at least one application.

(S2) A system as described in paragraph (S1), wherein the first instructions, when executed by the one or more first processors, cause the first device to: calculate, for a plurality of sentence vectors associated with previously searched actions, a cosine similarity between a sentence vector for the description of the action and each sentence vector of the plurality of sentence vectors associated with previously searched actions, determine, based on the cosine similarity for the plurality of sentence vectors associated with the previously searched actions, applications previously correlated to the previously searched actions, and rank the applications previously correlated to the previously searched actions, and the second instructions, when executed by the one or more second processors, cause the second device to present the at least one application based on the rank of the applications.

(S3) A system as described in any of paragraphs (S1) through (S2), wherein the one or more records are stored in a database, and wherein the first instructions, when executed by the one or more first processors, further cause the first device to: receive, from the second device, an indication of a selected application from the at least one application, and store, in the database, a correlation between the description of the action and the selected application.

(S4) A system as described in any of paragraphs (S1) through (S3), wherein the first instructions, when executed by the one or more first processors, further cause the first device to: determine, for each of the at least one application, a frequency of use, and provide output to the second device to enable presentation of the frequency of use for each of the at least one application, and the second instructions, when executed by the one or more second processors, cause the second device to present the frequency of use for each of the at least one application.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. And, although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, by a computing device, data indicative of an intent of a user to perform an action via at least one application, the data comprising a description of the action input into a client device;
    identifying, by the computing device, the at least one application based on a comparison of the description of the action and one or more records, the one or more records being indicative of prior intents of one or more users to perform actions and indicative of at least one selection by the one or more users to perform the actions with a selected application; and
    providing, by the computing device, output to the client device to enable performance of the action via the at least one application;
    determining, based on the description of the action, a word vector for each word in the description of the action, wherein the word vector for each word in the description of the action comprises three hundred dimensions; and
    determining, based on weighting the word vector for each word, a sentence vector for the description of the action.

2. The method of claim 1, wherein determining the sentence vector for the description of the action comprises determining a frequency of each word in the description of the action.

3. The method of claim 1, wherein identifying the at least one application based on the comparison of the description of the action and the one or more records comprises:
    calculating, for a plurality of sentence vectors associated with previously searched actions, a cosine similarity between the sentence vector for the description of the action and each sentence vector of the plurality of sentence vectors associated with previously searched actions;
    determining, based on the cosine similarity for the plurality of sentence vectors associated with the previously searched actions, applications previously correlated to the previously searched actions; and
    ranking the applications previously correlated to the previously searched actions.

4. The method of claim 1, wherein the one or more records are stored in a database, the
    method further comprising:
    receiving, from the client device, an indication of a selected application from the at least one application; and
    storing, in the database, a correlation between the description of the action and the selected application.

5. The method of claim 1, further comprising:
    determining, for each of the at least one application, a frequency of use; and
    providing output to the client device to enable presentation of the frequency of use for each of the at least one application.

6. The method of claim 1, further comprising:
    accessing a look-up table associating words with applications; and
    determining a correspondence, based on the look-up table, between at least one record of the one or more records and an application.

7. The method of claim 1, wherein the one or more records are a subset of records associated with previously searched action from an organization.

8. An apparatus comprising
    one or more processors; and
    memory storing instructions that, when executed by the one or more processors, cause the apparatus to:
    receive data indicative of an intent of a user to perform an action via at least one application, the data comprising a description of the action input into a client device;
    identify the at least one application based on a comparison of the description of the action and one or more records, the one or more records being indicative of prior intents of one or more users to perform actions and indicative of at least one selection by the one or
    more users to perform the actions with a selected application;
    provide output to the client device to enable performance of the action via the at least one application;
    determine, based on the description of the action, a word vector for each word in the description of the action, wherein the word vector for each word in the description of the action comprises three hundred dimensions; and
    determine, based on weighting the word vector for each word, a sentence vector for the description of the action.

9. The apparatus of claim 8, wherein the instructions, when executed by the one or more processors, further cause the apparatus to determine a frequency of each word in the description of the action.

10. The apparatus of claim 8, wherein the instructions, when executed by the one or more processors, further cause the apparatus to:
calculate, for a plurality of sentence vectors associated with previously searched actions, a cosine similarity between the sentence vector for the description of the action and each sentence vector of the plurality of sentence vectors associated with previously searched actions;
determine, based on the cosine similarity for the plurality of sentence vectors associated with the previously searched actions, applications previously correlated to the previously searched actions; and
rank the applications previously correlated to the previously searched actions.

11. The apparatus of claim 8, wherein the one or more records are stored in a database, and wherein the instructions, when executed by the one or more processors, further cause the apparatus to:
receive, from the client device, an indication of a selected application from the at least one application; and
store, in the database, a correlation between the description of the action and the selected application.

12. The apparatus of claim 8, wherein the instructions, when executed by the one or more processors, further cause the apparatus to:
determine, for each of the at least one application, a frequency of use; and
provide output to the client device to enable presentation of the frequency of use for each of the at least one application.

13. The apparatus of claim 8, wherein the instructions, when executed by the one or more processors, further cause the apparatus to:
access a look-up table associating words with applications; and
determine a correspondence, based on the look-up table, between at least one record of the one or more records and an application.

14. The apparatus of claim 8, wherein the one or more records are a subset of records associated with previously searched action from an organization.

15. A system comprising:
a first device comprising one or more first processors and first memory;
a second device comprising one or more second processors and second memory;
wherein the first memory stores first instructions that, when executed by the one or more first processors, cause the first device to:
receive data indicative of an intent of a user to perform an action via at least one application, the data comprising a description of the action;
identify the at least one application based on a comparison of the description of the action and one or more records, the one or more records being indicative of prior intents of one or more users to perform actions and indicative of at least one selection by the one or more users to perform the actions with a selected application;
provide, to the second device, output to enable performance of the action via the at least one application;
calculate, for a plurality of sentence vectors associated with previously searched actions, a cosine similarity between a sentence vector for the description of the action and each sentence vector of the plurality of sentence vectors associated with previously searched actions;
determine, based on the cosine similarity for the plurality of sentence vectors associated with the previously searched actions, applications previously correlated to the previously searched actions; and
rank the applications previously correlated to the previously searched actions; and
wherein the second memory stores second instructions that, when executed by the one or more second processors, cause the second device to:
determine, based on user input, the description of the action;
send, to the first device, the description of the action;
receive, from the first device, the output to enable performance of the action via the at least one application; and
present the at least one application based on the rank of the applications.

16. The system of claim 15, wherein the one or more records are stored in a database, and wherein the first instructions, when executed by the one or more first processors, further cause the first device to:
receive, from the second device, an indication of a selected application from the at least one application; and
store, in the database, a correlation between the description of the action and the selected application.

17. The system of claim 15, wherein:
the first instructions, when executed by the one or more first processors, further cause the first device to:
determine, for each of the at least one application, a frequency of use; and
provide, to the second device, output to enable presentation of the frequency of use for each of the at least one application; and
the second instructions, when executed by the one or more second processors, cause the second device to present the frequency of use for each of the at least one application.

* * * * *